United States Patent
Sundberg et al.

(10) Patent No.: US 7,034,260 B2
(45) Date of Patent: Apr. 25, 2006

(54) METHOD OF MAKING A HEATING ELEMENT OF MOLYBDENUM SILICIDE TYPE

(75) Inventors: Mats Sundberg, Västerås (SE); Anders Magnusson, Västerås (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/510,144

(22) PCT Filed: Apr. 4, 2003

(86) PCT No.: PCT/SE03/00556

§ 371 (c)(1),
(2), (4) Date: Mar. 15, 2005

(87) PCT Pub. No.: WO03/087016

PCT Pub. Date: Oct. 23, 2003

(65) Prior Publication Data

US 2005/0184058 A1    Aug. 25, 2005

(30) Foreign Application Priority Data

Apr. 5, 2002  (SE) .................................... 0201042
Apr. 5, 2002  (SE) .................................... 0201043

(51) Int. Cl.
   *H05B 3/10*   (2006.01)

(52) U.S. Cl. .................................................... 219/553

(58) Field of Classification Search ........ 219/543–548, 219/552–553, 270; 29/610.1, 620; 428/209, 428/408, 688

See application file for complete search history.

(56) References Cited

U.S. PATENT DOCUMENTS

| 3,269,806 A | 8/1966 | Fitzer et al. ................. 338/333 |
| 4,555,358 A | 11/1985 | Matsushita et al. ......... 252/516 |
| 5,708,408 A | 1/1998 | Sundberg .................... 338/306 |
| 6,099,978 A * | 8/2000 | Sekhar ....................... 428/688 |
| 6,482,759 B1 | 11/2002 | Sundberg et al. ........... 501/96.3 |
| 6,563,095 B1 | 5/2003 | Sundberg .................... 219/553 |
| 6,657,166 B1 * | 12/2003 | Funaki et al. ............... 219/270 |
| 6,707,016 B1 | 3/2004 | Sundberg .................... 219/548 |
| 2004/0056021 A1 * | 3/2004 | Sundberg .................... 219/548 |
| 2004/0094535 A1 | 5/2004 | Sundberg .................... 219/548 |
| 2004/0156772 A1 | 8/2004 | Sundberg et al. ........... 423/324 |

FOREIGN PATENT DOCUMENTS

GB           899464        *   6/1962

* cited by examiner

*Primary Examiner*—Tu Hoang
(74) *Attorney, Agent, or Firm*—Alfred J. Mangels

(57) ABSTRACT

A method of producing a heating element made from molybdenum silicide and alloys thereof, and which includes aluminum oxide on its surface. A material is produced that contains substantially $Mo(Si_{1-x}Al_x)_2$ and $Al_2O_3$ by mixing a mixture of a silicon and molybdenum compound with an aluminum compound. Either of the silicon and molybdenum compounds include $Mo(Si_{1-y}Al_y)_2$ and are mixed with one or both of an aluminum compound in the form of $Al_2O_3$ or $Al(OH)_3$ and optionally the compounds $SiO_2$, Si, and $MoO_3$, or by virtue of the mixture of the silicon and molybdenum compound containing $MoO_3$ and Al and Si and/or $SiO_2$. The input components together have a degree of purity corresponding to at least 98%. The mixture reacts exothermically and/or by being sintered, so that exchange reactions take place to form the compounds $Mo(Si_{1-x}Al_x)_2$ and $Al_2O_3$, where x lies in the range of 0.4–0.6.

12 Claims, No Drawings

METHOD OF MAKING A HEATING ELEMENT OF MOLYBDENUM SILICIDE TYPE

BACKGROUND OF THE INVENTION

1. Field of the Invention

The present invention relates to a method of manufacturing a heating element of the molybdenum silicide type.

2. Description of the Related Art

An electric resistance element of the molybdenum silicide type is described in Swedish Patent Specifications 0003512-1 and 0004329-9. According to patent specification 0003512-1 the resistance material of the heating element includes $Mo(Si_{1-x}Al_x)_2$, which contains aluminum to an extent at which the formation of pest is essentially prevented.

It has been found that when such material is operated in a temperature range of 400–600° C. no pest, or only a slight amount of pest, is formed. Pest is formed by virtue of the formation of $MoO_3$ from $MoSi_2$ and $O_2$.

The reason why the formation of pest is significantly reduced or is eliminated is due to the formation of $Al_2O_3$, or a layer rich in $Al_2O_3$, on the surface of the element.

The other Swedish patent specification, 0004329-9, teaches a method of increasing the useful life span of heating elements that essentially consist of molybdenum suicide and alloys of that basic material when the element operates at high temperatures.

According to that patent specification, the heating element contains aluminum to an extent sufficient to maintain a stable, slowly growing layer of aluminum oxide on the surface of the heating element.

According to one preferred embodiment the heating element material contains $Mo(Si_{1-x}Al_x)_2$, where x lies in the range of 0.2–0.6.

A material of the molybdenum silicide type that contains aluminum has been found to possess improved corrosion properties at both low and high temperatures.

Such material is often produced by mixing $MoSi_2$ powder with oxidic raw material, such as aluminosilicates. When the raw material is bentonite clay, there is obtained a relatively low melting point that contributes towards so-called smelt phase sintering, which results in dense materials that contain $MoSi_2$ and a proportion of aluminum silicate corresponding to 15–20 percent by volume.

Bentonite clay containing chiefly $SiO_2$ can be used in the production of heating elements containing $Mo(Si_{1-x}Al_x)_2$. When sintering with an Al-alloyed silicide there takes place a chemical exchange reaction in which the greater affinity of the oxygen to Al than to Si results in Si leaving the aluminum silicate and entering the silicide as a result of Al leaving the silicide and being taken up by the oxide phase. This exchange reaction also contributes towards improved sintering properties of the composite material. The final material contains $Mo(Si_{1-x}Al_x)_2$ that is substantially depleted of Al, where the oxide phase contains $Al_2O_3$ in all essentials.

The standard procedure of manufacture involves mixing molybdenum, silicon, and aluminum in powder form, and firing the powder mix normally under a shielding gas atmosphere. That results in a cake of the material $Mo(Si_{1-y}Al_y)_2$, where y is larger than x in the above formula as a result of said exchange reaction. The reaction is exothermic. The cake is then crushed and ground down to a fine particle size normally in the order of 1–20 μm. The resulting powder is mixed with bentonite clay to form a wet ceramic material. That material is extruded and dried to a rod form whose diameter corresponds to the diameter of the subsequent heating element. The material is then sintered at a temperature that exceeds the smelting temperature of the bentonite component.

However, there is a drawback with an element of that kind. The problem is that the oxide that forms on the surface of the element, namely $Al_2O_3$, sometimes peels away or flakes off, i.e., loosens from the surface of the element, in cyclic operation.

A peeling oxide gives poorer protection against continued oxidation of aluminum, which becomes impoverished in the outer surface of the element more quickly. Moreover, oxide peelings can contaminate the oven in which the element is fitted, with the risk that performance and the appearance of products heat treated in ovens that have such elements will be significantly impaired. This thus restricts the use of such elements in heating processes.

SUMMARY OF THE INVENTION

This problem is solved by the solution taught in each of the two Swedish Patent Specifications 0201042-9 and 0201043-7, which provide the basis for the claim for priority in the present application.

Swedish Patent Specification 0201042-9 teaches a method of producing a heating element that comprises substantially molybdenum silicide and alloys of that basic material. The method is characterized by producing a material that contains chiefly $Mo(Si_{1-x}Al_x)_2$ and $Al_2O_3$ by mixing molybdenum aluminosilicide $(Mo(Si_{1-x}Al_x)_2)$ with $SiO_2$, where the $SiO_2$ is at least 98% pure.

Swedish Patent Specification 0201043-7 teaches the production of a corresponding material, where bentonite clay is used to add silicon dioxide and aluminum oxide. The bentonite clay should have a contaminating substance content of less than 2000 ppm.

It has been found, surprisingly, that there is obtained at low contaminant consistencies an oxide which does not peel after cyclic operation between room temperature and high temperatures, for instance 1500° C. The present invention is based on the insight that such a pure aluminum-oxide-building molybdenum silicide material can be produced beneficially by beginning partly with other material and compounds than those given above.

DESCRIPTION OF THE PREFERRED EMBODIMENTS

The present method of production of a heating element that is comprised essentially of molybdenum silicide and its alloys includes the step of producing a material that contains essentially $Mo(Si_{1-x}Al_x)_2$ and $Al_2O_3$ by mixing a mixture of silicon and molybdenum compound with an aluminum compound.

According to the invention, silicon and the molybdenum compound include $Mo(Si_{1-y}Al_y)_2$ and are mixed with either an aluminum compound consisting of $Al_2O_3$ or of $Al(OH)_3$, and are optionally mixed with one or more of the compounds $SiO_2$, Si, and $MoO_3$.

According to a second embodiment, silicon and the molybdenum compound contain $MoO_3$ and Al, and Si and/or $SiO_2$.

According to the invention the input components together have a degree of purity of at least 98%.

According to a preferred embodiment of the invention the input components have a degree of purity of at least 99%.

The mixture reacts exothermically and/or by being sintered so that exchange reactions take place, to form the compounds $Mo(Si_{1-x}Al_x)_2$ and $Al_2O_3$, where x lies in the range of 0.4–0.6.

There is obtained by this method a heating element material that is aluminum-oxide-building and whose aluminum oxide layers will not peel or flake, which was mentioned as a problem in the beginning of this document.

According to one preferred embodiment x lies in the range of 0.45–0.55.

According to one preferred embodiment, the $SiO_2$ is included in silicates, where the remaining substances in the silicate have such properties that molybdenum silicide is unable to alloy with said substance or substances, and also have such properties that the symmetry of the crystal lattice of the molybdenum silicide is retained.

It is possible to substitute molybdenum partly with Re, W, or Nb in the material $Mo(Si_{1-x}Al_x)_2$ without changing the symmetry of the crystal lattice.

Molybdenum can be replaced with tungsten (W) in an amount corresponding approximately to one third.

According to one preferred embodiment one or more of the following sintering auxiliaries MgO, CaO, $SiO_2$, and $Y_2O_3$ is/are added to the mixture.

The present invention thus solves the problem mentioned in the introduction and enables the present element to be used beneficially in ovens without detriment to the material treated in the oven.

The present invention shall not be considered to be limited to the above-described embodiments, since variations can be made within the scope of the accompanying claims.

What is claimed is:

1. A method of producing a heating element containing essentially molybdenum silicide and alloys thereof, which forms aluminum oxide on its surface, said method comprising the steps of: producing a material that contains substantially $Mo(Si_{1-x}Al_x)_2$ and $Al_2O_3$ by mixing a mixture of a silicon and a molybdenum compound with an aluminum compound, wherein the silicon and molybdenum compound mixture is mixed with an aluminum compound including at least one of $Al_2O_3$ or $Al(OH)_3$, wherein the mixture of a silicon and a molybdenum compound with an aluminum compound includes components that together have a degree of purity corresponding to at least 98%; and reacting the mixture components by at least one of exothermic reaction and sintering so that exchange reactions take place to form the compounds $Mo(Si_{1-x}Al_x)_2$ and $Al_2O_3$, where x lies in the range of 0.4–0.6.

2. A method according to claim 1, wherein $SiO_2$ is included in the mixture is a silicate and does not affect symmetry of molybdenum suicide crystal lattice.

3. A method according to claim 1, wherein x lies in the range of 0.45–0.55.

4. A method according to claim 1, including the step of adding at least one of sintering auxiliaries MgO, CaO, $SiO_2$ and $Y_2O_3$ to said mixture.

5. A method according to claim 1, including the step of partially substituting for molybdenum at least one of Re or W or Nb in the material $Mo(Si_{1-x}Al_x)_2$.

6. A method according to claim 5, including the step of replacing molybdenum with W in an amount corresponding to approximately one third.

7. A method according to claim 1, wherein the mixture components together have a degree of purity of at least 99%.

8. A method according to claim 1, including the step of adding to the mixture at least one of the compounds $SiO_2$, Si, and $MoO_3$.

9. A method according to claim 1, wherein the mixture of the silicon and the molybdenum compound contains $MoO_3$ and Al, and at least one of Si and $SiO_2$.

10. A method according to claim 2, wherein the silicate is mullite.

11. A method according to claim 2, wherein the silicate is sillimanite.

12. A method according to claim 1, wherein the heating element includes a surface layer of aluminum oxide that is retained after cyclic operation of the heating element between room temperature and 1500° C.

* * * * *